(12) United States Patent
Goyal et al.

(10) Patent No.: US 11,397,752 B1
(45) Date of Patent: Jul. 26, 2022

(54) IN-MEMORY INGESTION FOR HIGHLY AVAILABLE DISTRIBUTED TIME-SERIES DATABASES

(71) Applicant: Amazon Technologies, Inc., Seattle, WA (US)

(72) Inventors: Dumanshu Goyal, Seattle, WA (US); Mustafa Ozan Ozen, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 513 days.

(21) Appl. No.: 16/454,748

(22) Filed: Jun. 27, 2019

(51) Int. Cl.
*G06F 16/20* (2019.01)
*G06F 16/27* (2019.01)
*G06F 16/28* (2019.01)
*G06F 11/14* (2006.01)

(52) U.S. Cl.
CPC ........ *G06F 16/278* (2019.01); *G06F 11/1451* (2013.01); *G06F 16/28* (2019.01)

(58) Field of Classification Search
None
See application file for complete search history.

(56) References Cited

U.S. PATENT DOCUMENTS

| | | | |
|---|---|---|---|
| 9,672,257 B2 * | 6/2017 | Tobin | G06F 16/2428 |
| 10,997,137 B1 * | 5/2021 | Goyal | G06F 16/248 |
| 2013/0103657 A1 * | 4/2013 | Ikawa | G06F 16/2477 707/693 |
| 2020/0167355 A1 * | 5/2020 | Rath | G06F 16/2457 |
| 2020/0167361 A1 * | 5/2020 | Princehouse | G06F 3/067 |

* cited by examiner

*Primary Examiner* — Belix M Ortiz Ditren
(74) *Attorney, Agent, or Firm* — Nicholson De Vos Webster & Elliott LLP

(57) ABSTRACT

Techniques for -memory ingestion for highly available distributed time-series databases are described. A method of in-memory ingestion may include obtaining, by a host of a time series database, time series data from one or more electronic devices, the time series database including a plurality of portions of the time series database spread across a plurality of hosts, the plurality of portions of the time series database including at least one hot portion and a plurality of cold portions, storing the time series data in a volatile storage location associated with the hot portion on the host, detecting an event to store the time series data associated with the hot portion to a non-volatile storage location on the host, and storing the time series data associated with the hot portion to the non-volatile storage location.

20 Claims, 11 Drawing Sheets

US 11,397,752 B1

IN-MEMORY INGESTION FOR HIGHLY AVAILABLE DISTRIBUTED TIME-SERIES DATABASES

BACKGROUND

Database systems managing large amounts of data on behalf of users may distribute and/or replicate that data across two or more machines, often in different locations, for any of a number of reasons, including security issues, disaster prevention and recovery issues, data locality and availability issues, etc. As the scale of data stored increases, database systems may implement different techniques for distributing and replicating data that can cope with the increasing demand upon data storage resources to provide highly performant access to data while still preserving the various management features that contribute to data availability and durability. For example, multiple copies of data may be stored at different locations in order to distribute the risk of failure amongst the differently locations.

BRIEF DESCRIPTION OF DRAWINGS

Various embodiments in accordance with the present disclosure will be described with reference to the drawings, in which.

DETAILED DESCRIPTION

The present disclosure relates to methods, apparatus, systems, and non-transitory computer-readable storage media for in-memory ingestion for highly available distributed time-series databases. According to some embodiments, time series databases may store time series data (e.g., data value(s) indexed according to time), which may subsequently be queried to perform various types of requests or analyses upon the time series data. Time series databases may distribute copies of data in a time series database to increase the availability, reliability and performance of the time series database to perform queries. A time series database may include multiple storage tiers, each providing different performance characteristics. For example, a hot tier may ingest high throughput time-series data and store the data in-memory to serve low latency queries. A cold tier may be used to archive data and may be implemented on magnetic media, or other durable storage medium, which provides effective long term storage but serves higher latency queries. A warm tier may store the time-series data on a solid state drive to provide durable storage serve queries at a latency between the hot tier and the cold tier. The hot, warm, and cold tiers may each store time series data across different time periods. For example, the hot tier may store the most recently received eight hours of data, the warm tier may store the most recent week of data, and the cold tier may store the most recent year. The actual time periods stored in each tier may be configured by the customer, administrator, or other entity.

In some embodiments, to provide high availability, portions of the time series data (e.g., a range or other portion of the time series data, such as a partition or tile) stored in the hot tier can be distributed across multiple hosts. A given portion can be replicated to multiple hosts which may be located in different areas of a provider network. Embodiments improve ingestion throughput to these tiles, making the time series data available to be queried by users of the time series database. Time series data can be ingested into in-memory locations, providing high performance, low latency query processing. However, by being stored in memory, if the host fails the volatile memory may be cleared and the data may be lost. Embodiments provide various backup techniques for this data which enables high ingestion throughput and reduces the risk of data loss.

Figure 1:
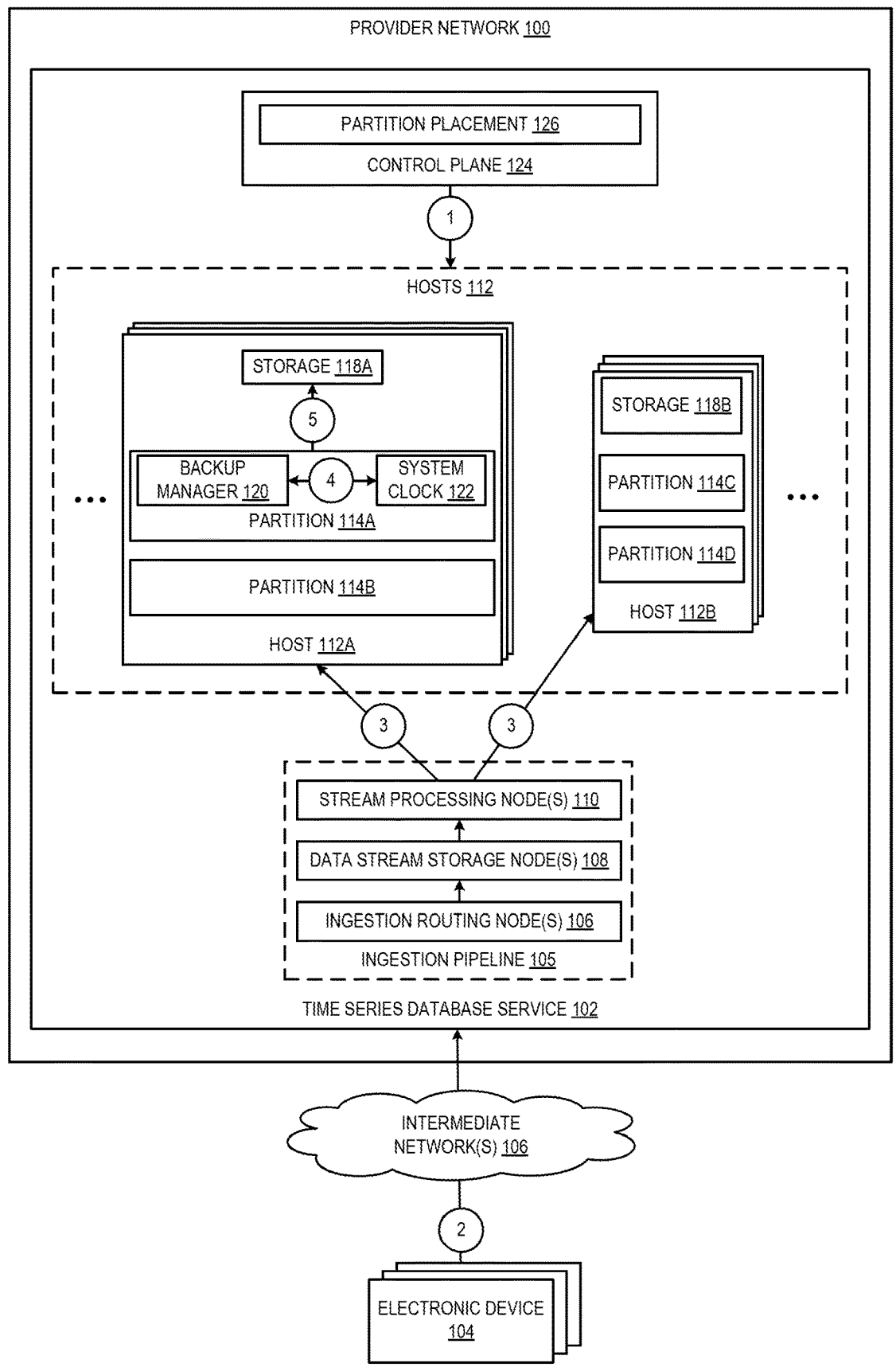
FIG. 1 is a diagram illustrating an environment for in-memory ingestion for highly available distributed time-series databases according to some embodiments.

FIG. 1 is a diagram illustrating an environment for in-memory ingestion for highly available distributed time-series databases according to some embodiments. As shown in FIG. 1, a time series database service 102 may be provided by a provider network 100. Time series database service 102 can store time series data on behalf of customers and provide an interface through which the data stored thereon may be queried by those customers, administrators, or other users.

A provider network 100 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

The time series database may include a number of hosts 112, including host 112A and host 112B. At numeral 1, a control plane 124 can provision a plurality of hosts 112 for time series database 102. In some embodiments, time series database may include multiple storage tiers and hosts may be provisioned to each tier. Different storage tiers may offer different types of query processing (or other analysis request) performance. For example, a hot storage tier may ingest time series data into an in-memory data structure for providing fast query responses, a cold storage tier may ingest time series data into persistent storage as files or data objects (e.g., instead of individual records as may be implemented in the hot storage tier), and a warm tier may ingest time series data into local persistent storage that may provide improved processing cost and latency as compared to the cold tier. The plurality of hosts can be provisioned in response to a request from a customer, administrator or other entity. For example, a customer may request that hosts be provisioned and may specify a first length of time that data is stored in the hot tier, a second length of time for the warm tier, and a third length of time for the cold tier. For example, the hot tier may store the most recent 8 hours of data, the warm tier may store the most recent week of data, and the cold tier can store one or more years of data.

Each host may include at least a portion of a time series database (e.g., a range or other portion of the time series data, such as a partition). For example, host 112A includes partitions 114A and 114B, while host 112B includes partitions 114C and 114D. In various embodiments, a given host may include more or fewer partitions. These partitions, also referred to herein as tiles, may store data received from the same customer or different customers. In the example shown in FIG. 1, hosts 100 may belong to the hot tier, with each partition corresponding to a different portion of the hot tier. The hot tier may be partitioned based on series being stored and time. For example, each partition may be two dimensional, where a first dimension is spatial corresponding to the series to which the data in a partition belongs, and a second dimension corresponding to a period of time which that partition includes (e.g., one partition may include data collected between 2:00-2:30 pm, while a second partition may include data collected between 2:30-3:00 pm, etc.). Based on this partitioning scheme, it is possible to identify one or more "hot" partitions of the hot tier. The hot partitions may correspond to those partitions whose time dimension overlaps with the current time (e.g., as provided by a host 112, provider network 100, time series database 102, or other clock accessible to the hosts.

In some embodiments, during provisioning, partition placement 126 is responsible for placing partitions on the hosts 112. If multiple hot partitions are placed on the same host, the risk of host failure imperils multiple partitions worth of data. To reduce this risk, partition placement 124 can place the partitions 114 such that multiple hot partitions (e.g., partitions with time dimensions corresponding to the same or overlapping periods of time) are not mapped to the same host. Accordingly, this provides an additional level of fault isolation between hot partitions, such that failure of a single host does not cause the loss of data from multiple partitions.

At numeral 2, one or more electronic devices 104 can send time series data to time series database service 102. The time series data can be processed by ingestion pipeline 105 at least one partition is updated with the new time series data received from the one or more electronic devices 104. Time series data may include measurement values over time. Time series data received from a particular device may be referred to as a series. For example, internet of things (IoT) device may emit a series, a hardware monitor may emit a series, etc. Each series may have multiple dimensions. Dimensions can identify one or more metrics in a given series. For example, the hardware monitor may emit a series having a CPU dimension, a memory dimension, etc. The data included in a given series may be represented as key value pairs, where the key is the timestamp and the value is the measurement value. Ingestion of time series data may be performed through an ingestion pipeline 105 that includes ingestion routing node(s) 106, data stream storage nodes 108, and stream processing nodes 110. The ingestion pipeline is discussed further below at least with respect to FIGS. 6 and 7.

At numeral 3, the stream processing nodes 110 of the ingestion pipeline 105 can distribute the time series data to the appropriate partitions. As discussed, the time series data can be sent to one or more partitions whose time dimension corresponds to the key of the time series data being received. Typically, time series data is received by the time series database in approximately real time, and therefore the hot partitions correspond to those partitions whose time dimension overlaps with the current time. However, some customers may have a complicated data processing pipeline within their systems, may provide data in a batch, or may otherwise delay providing their data to the time series database. In such situations, the hot partition may correspond to an offset of the current time, the offset determined based on the customer delay. In some embodiments, during provisioning, the customer may indicate such an offset to be used when determining the hot partition.

The other partitions 114 of the hot tier, whose time dimensions do not overlap with the current time (or an offset thereof) may not be receiving any time series data. For example, if each partition stores half an hour of data, and the hot tier maintains eight hours of data, then there will be at least 16 tiles (potentially more than 16 tiles, depending on how many series are being recorded). In the embodiment shown in FIG. 1, for example, partitions 114A and 114C may be hot partitions, actively receiving time series data from stream processing nodes 110, while partitions 114B and 114D may be cold partitions that are not currently receiving data. If host 112A were to fail, the data in the hot partition may be lost, as it is maintained in volatile memory, rather than persistent storage. In some embodiments, replicas of each partition may be maintained on different hosts. In the event one host fails, its one or more replicas can serve requests for that time series data, and the failed host may be recovered in the background.

Embodiments may provide an additional level of backup via local storage 118 on each host. When a partition goes cold (e.g., when its time dimension no longer overlaps the current time), it can store a copy of its data locally. Local storage 118 may include a solid state drive (SSD) or other persistent data store. Each partition can include a backup manager 120 which can detect backup events and cause the time series data stored in-memory on the partition to be backed up to local persistent storage. In the example shown in FIG. 1, the backup manager can maintain an active time parameter specified by the customer, administrator, or other entity. The active time parameter may be the time dimension of the partition or may be a different time period based on the time dimension (e.g., time dimension +/−2 hours, or other configurable time period). At numeral 4, the backup manager can detect a backup event. In the example shown in FIG. 1, the backup event may be based on time. For example, the backup manager can compare a current system time, or a time period based on the current time, obtained from a system clock 122, to the active time parameter. If the current time falls within the active time parameter, then the partition is considered hot, and it is actively receiving data from the stream processors 110. If the current system time does not fall within the active time parameter, then the partition may be considered a cold partition that is no longer receiving time series data. At numeral 5, the partition 114A can store its time series data to local storage 118A. In the event of host failure, the volatile memory can be repopulated from the local storage rather than a replica or another tier.

As discussed, each partition can be replicated on a plurality of additional hosts. In some embodiments, the hot partition(s) can have additionally have a second plurality of replicas. For example, a cold partition may have three replicas, while a hot partition may have six replicas. At numeral 4, when it is determined that the partition has gone cold, the second plurality of replicas can be terminated. In some embodiments, the backup manager 120 can send a message to control plane 124 indicating that it is no longer a hot partition and control plane 124 can terminate the second plurality of replicas for that hot partition. In some embodiments, rather than terminating the second plurality of replicas, the control plane 124 can reallocate the resources from the partition that has gone cold to a partition that has gone hot and is now receiving time series data.

When ingesting data in memory in the hot tier hosts 100, the stream processors can read the time series data and write it to multiple replicas. Once written to the replicas, the replicas can acknowledge they have received the data and the stream processors can remove the data from the data stream storage nodes 108. However, in some embodiments, this commit may be delayed by adding a write to disk checkpoint. This delays the commit until acknowledgement is received that the hot tier hosts have written the data to disk (e.g., once a partition has gone cold, as described above). This way, the ingestion pipeline maintains a copy of the data until it has been persistently stored in the hot tier. In the event of a failure, by a host or by the stream processors, the stream processors can replay the data from the data stream storage nodes, repopulating the hosts with the data that was lost.

Figure 2:
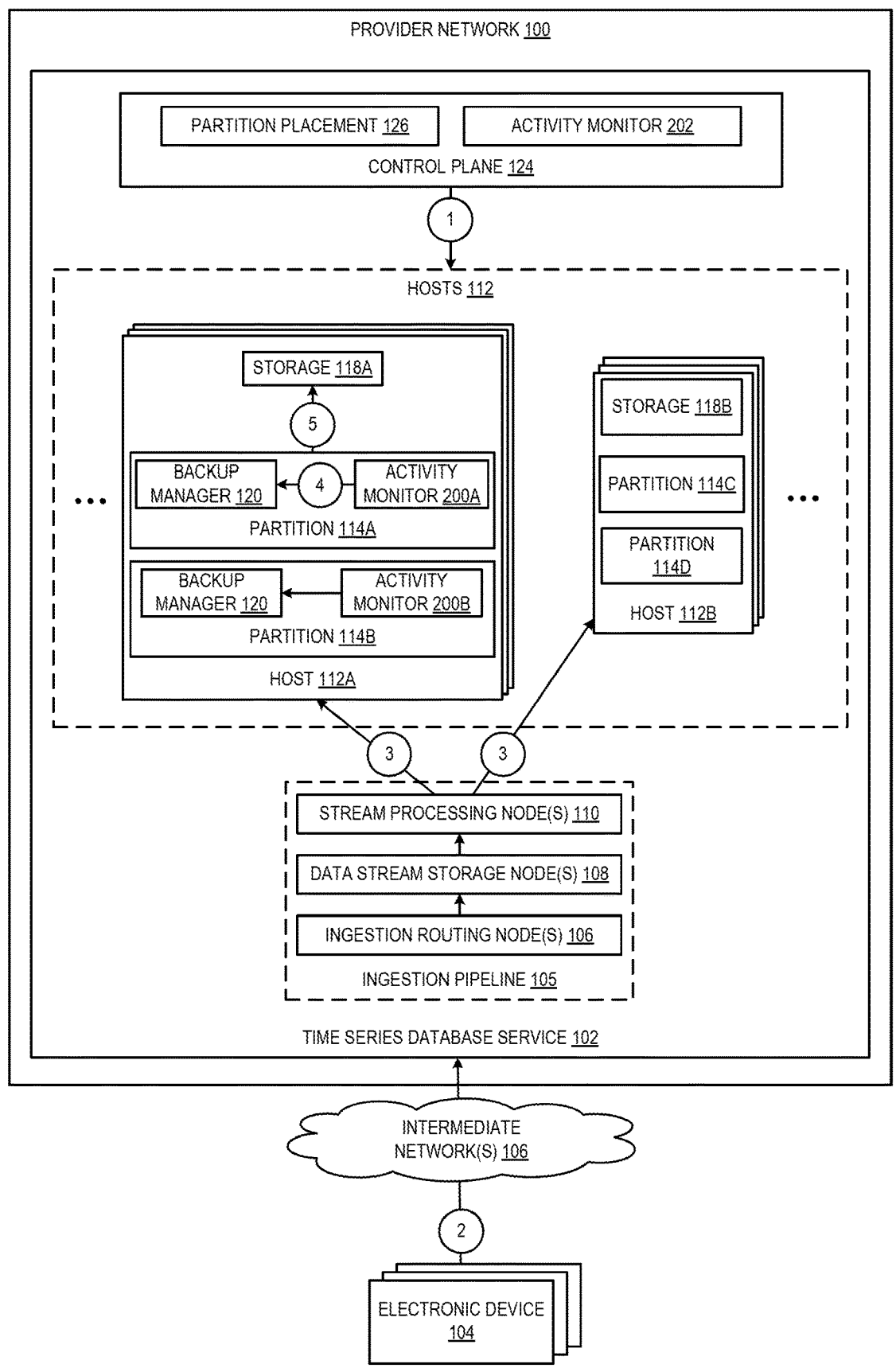
FIG. 2 is a diagram illustrating an alternative environment for in-memory ingestion for highly available distributed time-series databases according to some embodiments.

FIG. 2 is a diagram illustrating an alternative environment for in-memory ingestion for highly available distributed time-series databases according to some embodiments. In the above example described with respect to FIG. 1, the hot partition may be identified using a heuristic based on current time. That is, in most cases, the active partition(s) will be the partition(s) whose time dimension overlaps with the current time or a predictable offset thereof. However, there may be late arriving data from a customer who loads old data, an electronic device that crashes or loses network connectivity and uploads its data upon recovery, etc. In such situations, the late arriving data would be routed to whatever partition has a time dimension corresponding to the timestamps of the late arriving data. If this partition has already gone cold, then this late arriving data may not be backed up to local storage in the event of a host failure. The embodiment shown in FIG. 2 allows for such late arriving data to be backed up as well.

As shown in FIG. 2, hosts may be partitioned, and time series data received and routed to hosts similarly to that described above with respect to numerals 1-3 of FIG. 1. In the embodiment of FIG. 2, each partition 114 may include an activity monitor 200A, 200B. Activity monitor 200A can monitor traffic received by its partition 114A from stream processors 110. The activity monitor may include a configurable idle time period. The idle time period may be set by the customer, an administrator or other entity. In some embodiments, the idle time period may be set based on a statistical analysis of the distribution of time series data. For example, the idle time may correspond to two standard deviations greater than the average pause time between data being received by a hot partition. Although the embodiment of FIG. 2 shows each partition as having its own activity monitor, in some embodiments each host may have a single inactivity monitor. The inactivity monitor can monitor each partition on that host, as each partition will be ingesting data at different times.

As shown in FIG. 2, backup manager 120 can consume backup events published by the activity monitor 200A. Unlike the example of FIG. 1, where the backup events may be based on current time and the time dimension of the partition associated with the backup manager, in the example of FIG. 2, the backup events may be activity-based. For example, once the activity monitor 200A determines that no data has been received for at least the idle time period, at numeral 4 it can notify the backup manager that the partition has gone cold. At numeral 5, the partition can save its data to local store 118A. In some embodiments, a marker file can also be stored after the data has been stored to local storage 118, indicating that the partition has been successfully backed up. If there is no marker file written to local storage 118A, then it may be assumed that the data on that partition was lost, as discussed further below. In some embodiments, the marker file may point to the backed up partition data or may include the backed up partition data. In some embodiments, the marker file may only indicate that the partition has been backed up successfully. In some embodiments, each partition on a host may store its own marker file upon completion of a successful backup operation. If the customer has late arriving data for a partition, it will be routed to the partition and the activity monitor will detect that data has been received by the partition. The activity monitor will remove the marker file, then continue to monitor the partition. After it has been determined that the idle time period has elapsed again with no more data ingestion, the activity monitor can again notify the backup manager that the partition has gone cold and instruct it to backup the partition's data to the local storage. Once back up is complete, a new marker file can also be written to the local storage. This ensures that the stored backup remains accurate to the current state of the partition.

In some embodiments, control plane 124 may also include an activity monitor 202. The activity monitor can obtain a global view of activity among the hosts 112. Activity monitor 202 can be responsible for managing a number of replicas associated with each partition based on whether the partition is hot or cold (e.g., based on whether the partition is currently receiving time series data). In some embodiments, activity monitor 202 can obtain activity data from each activity monitor 200A, 200B on the hosts 112. When activity monitor 202 detects that a particular partition has gone hot (e.g., it has begun to receive time series data, or the current system time overlaps with an active time parameter associated with the partition), the control plane 124 can increase the number of replicas associated with the partition. For example, a cold partition may be replicated to three other hosts, while a hot partition may be replicated to six other hosts. The number of replicase associated with hot and cold partitions may be configurable and set by the time series database, an administrator, the customer, or other entity. When activity monitor 202 detects that a particular partition has gone cold (e.g., the partition has not received any data for longer than a threshold amount of time, or after receiving an inactivity message from the activity monitor associated with that partition), the activity monitor 202 can cause the control plane to reduce the number of replicas associated with that partition. For example, the control plane may reduce the number of replicas from six back to three (or other configurable numbers of replicas).

In the above examples described with respect to FIGS. 1 and 2, a backup manager can detect time-based and activity-based backup events, respectively. In some embodiments, a backup manager may detect both time-based and activity-based events. For example, the backup manager may cause the partition's data to be stored to persistent local storage once it has detected that the system time no longer overlaps with the active time parameter associated with the partition and may additionally detect activity events published by the activity monitor and cause subsequent backup operations to be performed. In some embodiments, the backup manager may detect additional backup events, such as a manual backup instruction received from an administrator, user, or other entity, a backup instruction sent by the electronic device and embedded in the time stream data (e.g., as a specific value in the time stream data that causes the backup manager to trigger a backup), or other backup events.

Figure 3:
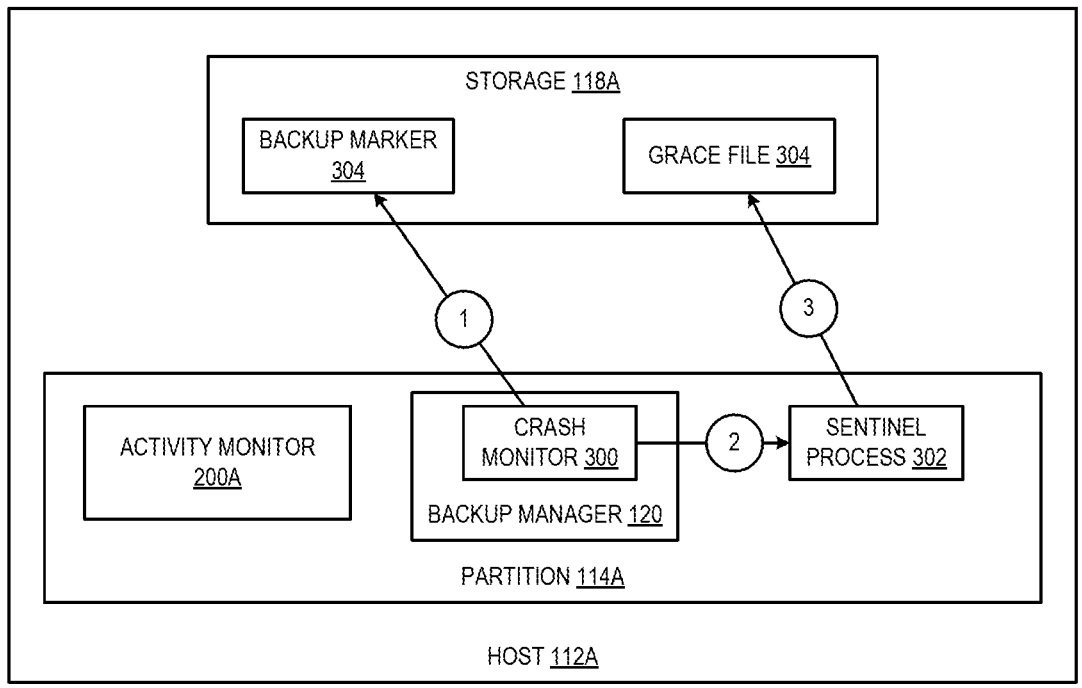
FIG. 3 is a diagram illustrating an example time series database host according to some embodiments.

FIG. 3 is a diagram illustrating an example time series database host according to some embodiments. As shown in FIG. 3, a partition 114A may include a backup manager 120, which includes a crash monitor 300, and a sentinel process 302. In the event of a failure, the crash monitor 300 can be started as part of the boot process of the partition. At numeral 1, the crash process can determine whether backup data is stored in local storage 118. This may include identifying a marker file 304 associated with the partition and/or the backed up time series data itself. If there has been a host failure, then the data stored in the volatile memory of the host has been lost and needs to be recovered, either from the local storage 118A or a replica of the partition on another host. However, whether the backup data 304 is valid depends on whether the failure was a host failure or a partition failure. The sentinel process 302 may be used by the crash monitor to determine whether there has been a host failure or a partition failure.

At numeral 2, when a partition comes online, the crash monitor can check whether the sentinel process is running. For example, when the sentinel process is running it can open a port to which partitions can connect. If the port is open, then the sentinel process is running and the failure was not host-wide. As such the volatile memory is intact and no recovery of the partition's data is needed. However, if the port is not open then the sentinel process has also failed and the volatile memory has been lost and needs to be recovered.

The sentinel process can be a process designed to run in the background on the host and to crash if the host or other operating system-level failure occurs. During startup, at numeral 3, the sentinel process 302 can determine whether a grace file 306 exists. In the embodiment of FIG. 3, the grace file may be stored in local storage 118A, however, the grace file may be stored in a storage service location, or other storage location accessible to sentinel process 302. As discussed further below, if the grace file exists, then the sentinel process deletes the grace file and opens the port to which the partitions may connect. If the grace file does not exist, then the sentinel process shut down unexpectedly, likely due to a host failure. The sentinel process will then terminate, without opening the port. During startup of the partition, if the marker file exists and the sentinel port is accessible, then the backup data associated with the marker file can be used to restore the volatile memory of the partition. However, if the sentinel port is not open, then the backup data may be incomplete, corrupted, or otherwise invalid and is discarded. The partition may then be recovered based on data from a replica or another storage tier.

Figure 4:
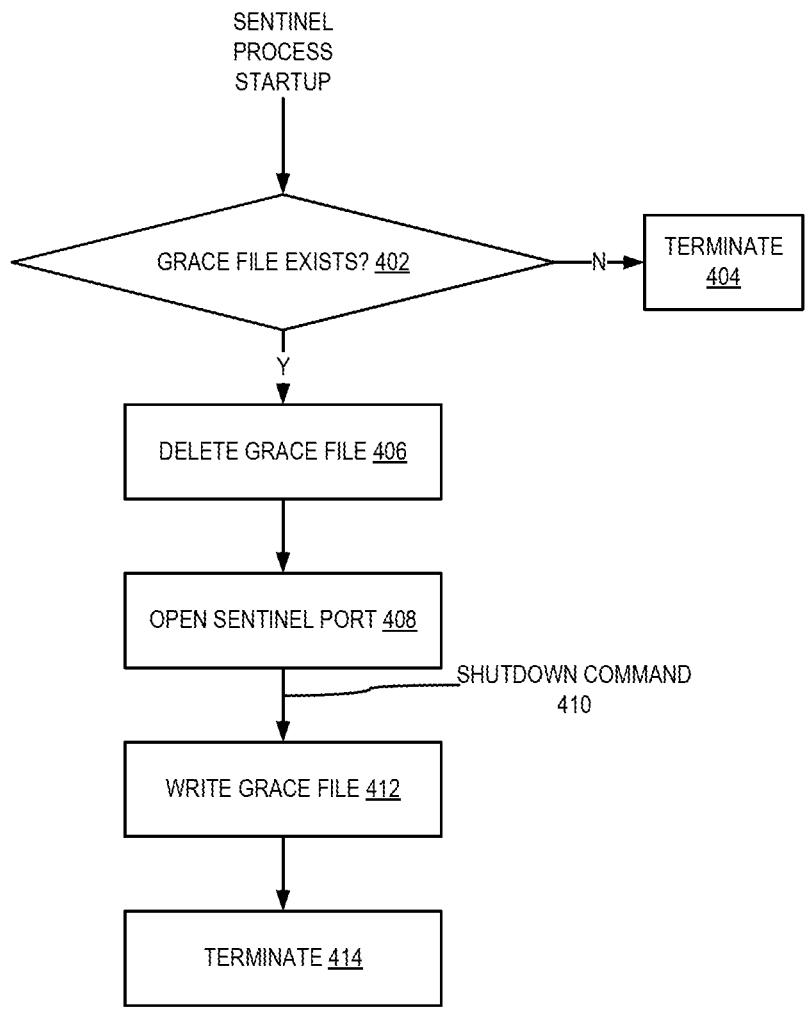
FIG. 4 is a diagram illustrating a sentinel startup process according to some embodiments.

FIG. 4 is a diagram illustrating a sentinel startup process according to some embodiments. In some embodiments, each host may include one or more partitions and a sentinel process. The sentinel process is configured crash when the host fails or other operating system-level failure event occurs on the host. The sentinel process may be used by the backup manager to determine whether a host-wide failure event has occurred, during startup of a partition.

As discussed, a sentinel process may run in the background on each host. On startup of the host, the sentinel process can be configured to determine whether it was properly shut down previously. If it was properly shutdown, then the sentinel process can open a port to which partitions may send requests to determine whether the port is open, indicating whether the sentinel process is running. As shown in FIG. 4, at 402, during startup the sentinel process can determine whether a grace file exists. The grace file can be a file stored locally on the host or remotely in a storage location of a storage service that indicates the sentinel process was intentionally shutdown previously.

At 404, if no grace file is found, the sentinel process terminates. The lack of a grace file indicates that the sentinel process was not intentionally shutdown previously, which likely indicates a host-wide failure event. As such, the sentinel process does not complete start up and open a sentinel port. Subsequently, as discussed, any partitions attempting to connect to the sentinel port will see that it is closed and will not use any backup data that was previously stored for that partition.

At 406, if the grace file was found, then the grace file is deleted. With the grace file deleted, if the sentinel process terminates unexpectedly, there will not be a grace file upon reboot. At 408, the sentinel process can complete startup and open the sentinel port. Any partitions that attempt to access the sentinel port will receive an acknowledgement indicating that the sentinel port is open. If a partition determines the sentinel port is open, which indicates the sentinel process has not experienced an unexpected termination, the partition can use backup data (if available) to quickly recover from a partition-level failure.

At 410, a shutdown command can be received by the sentinel process. The shutdown command can be generated by the backup manager, control plane, or the partition itself as part of a host shutdown process. At 412, in response to the shutdown command the sentinel process can write a new grace file (to local storage, a location in a storage service, or other storage location). With the grace file written, at a subsequent startup, the grace file will be identified by the sentinel process and the sentinel port will be reopened.

Figure 5:
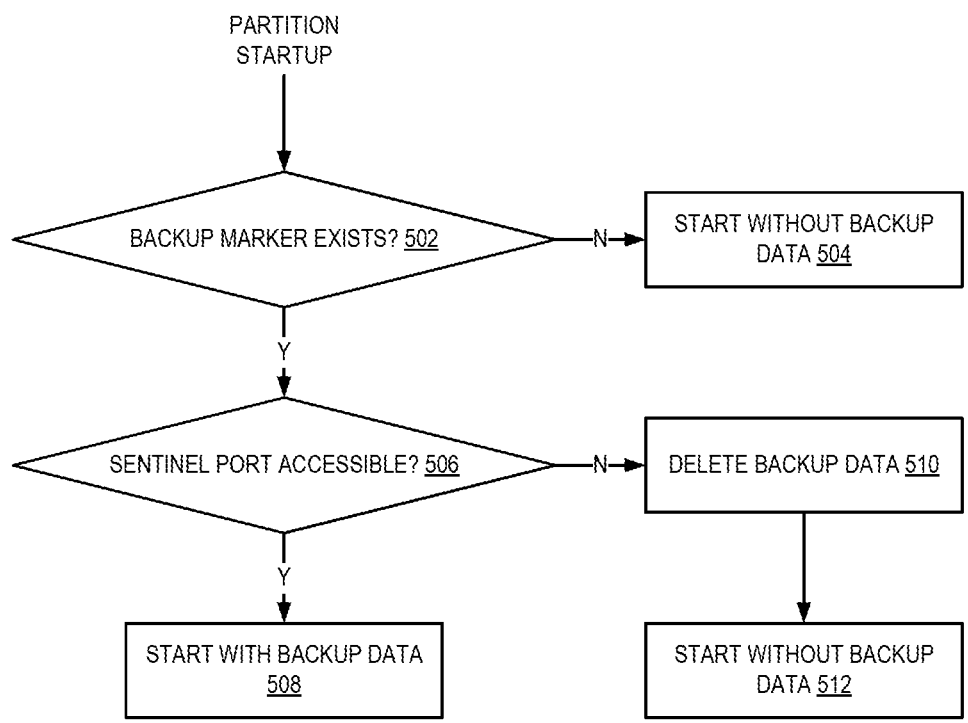
FIG. 5 is a diagram illustrating a crash recovery process according to some embodiments.

FIG. 5 is a diagram illustrating a crash recovery process according to some embodiments. As discussed, a partition may store a marker file to a local storage location on a host when the partition becomes cold (e.g., inactive for a configurable time period). The host may maintain multiple marker files each corresponding to a different partition. The marker file may include backup time series data of the partition from when it went cold. In some embodiments, the marker file may point to the backup time series data in local storage on the host. However, if a host crashes (e.g., due to power failure, operating system error, or other failure condition), when the host and the partition(s) running thereon is brought back online, the backup data may not be current, or may otherwise be corrupted. However, if the failure was transitory and/or limited to the partition itself, then the backup data is likely intact.

During crash recovery, embodiments may determine whether the failure was a host-level failure or a partition-level failure and based on that determination recovery the backup data or delete the backup data and perform recovery from a replica of the partition on a different host. When the partition starts-up, at 502 the partition can determine whether the marker exists. In some embodiments, this may be performed by backup manager 120 discussed above. The backup manager may be loaded during startup of the partition. In some embodiments, the marker file may be stored at a specific location in the local storage of the host (e.g., a location where the backup manager stored the file), may be retrieved using an identifier associated with the marker file and/or the partition, or other file lookup technique. If no marker file is found, at 504 the partition can continue startup without backup data.

If the marker file is found, then at 506 it can be determined whether the sentinel port is accessible. As discussed above, a sentinel process may run in the background on each host. On startup, the sentinel process can be configured to determine whether it was properly shut down previously. If it was properly shutdown, then the sentinel process can open a port to which partitions may send requests to determine whether the port is open, indicating whether the sentinel process is running. If the sentinel port is accessible, then at 508 the partition can be started up using the backup data stored locally. This enables the partition to be quickly restarted using local data without relying on recovery from remote replicas. If the sentinel port is not accessible, then at 510 the backup data stored locally can be deleted because it may be stale or corrupted. At 512, the partition can be started without backup data and recovery can be performed using one or more remote replicas.

Figure 6:
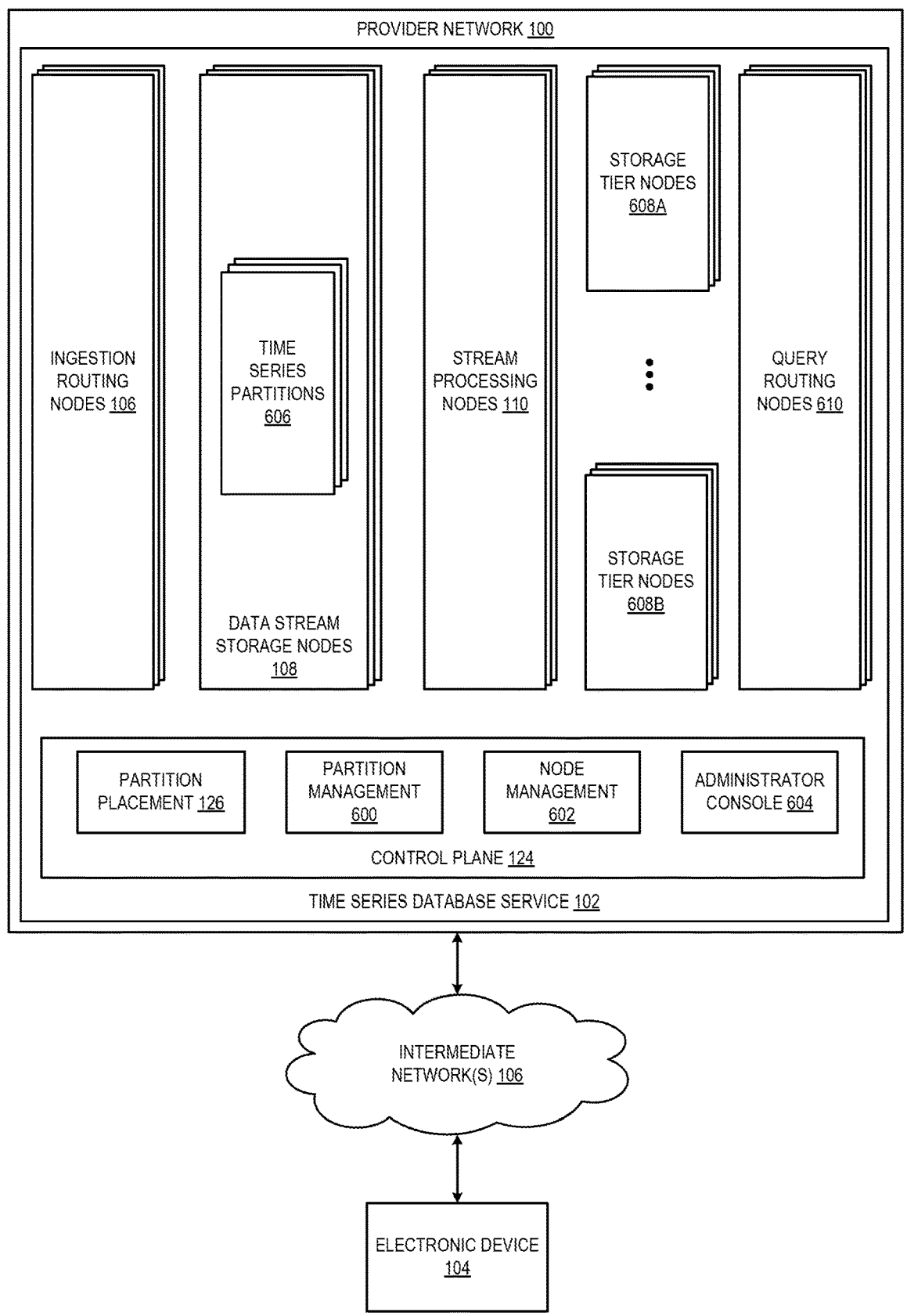
FIG. 6 is a diagram illustrating a provider network offering a time series database service that may implement in-memory ingestion for highly available distributed time-series databases, according to some embodiments.

FIG. 6 is a diagram illustrating a provider network offering a time series database service that may implement in-memory ingestion for highly available distributed time-series databases, according to some embodiments. Provider network 100 may be a private or closed system, in one embodiment, or may be set up by an entity such as a company or a public sector organization to provide one or more services (such as various types of cloud-based storage) accessible via the Internet and/or other networks to electronic device(s) 104. In one embodiment, provider network 100 may be implemented in a single location or may include numerous data centers hosting various resource pools, such as collections of physical and/or virtualized computer servers, storage devices, networking equipment and the like, needed to implement and distribute the infrastructure and storage services offered by the provider network 100. In one embodiment, provider network 100 may implement various computing resources or services, such as time series database service 102 (e.g., a database service that indexes or otherwise provides access to data modeled as time series of items (e.g., records)), and other services (not illustrated), such as a data warehouse service, data flow processing service, and/or other large scale data processing techniques), data storage services (e.g., an object storage service, block-based storage service, or data storage service that may store different types of data for centralized access), virtual compute services, and/or any other type of network-based services (which may include various other types of storage, processing, analysis, communication, event handling, visualization, and security services).

In various embodiments, the components illustrated in FIG. 6 may be implemented directly within computer hardware, as instructions directly or indirectly executable by computer hardware (e.g., a microprocessor or computer system), or using a combination of these techniques. For example, the components of FIG. 6 may be implemented by a system that includes a number of hosts. In one embodiment, the functionality of a given system or service component (e.g., a component of time series database service 102) may be implemented by a particular host or may be distributed across several hosts (also referred to as nodes). In some embodiments, a given host may implement the functionality of more than one service system component (e.g., more than one data store component).

In some embodiments, time series database service 102 may be implemented to store items (e.g., records, objects, logs, etc.) as a time series in a time series database. Such a service may be an enterprise-class database system that is highly scalable and extensible. In one embodiment, access requests (e.g., requests to get/obtain items, put/insert items, delete items, update or modify items, scan multiple items) may be directed to a time series in time series database service 102 that is distributed across multiple physical resources according to a partition scheme, and the database system may be scaled up or down on an as needed basis. In one embodiment, clients/subscribers may submit requests in a number of ways, e.g., interactively via graphical user interface (e.g., a console) or a programmatic interface to the database system. In one embodiment, time series database service 102 may provide a RESTful programmatic interface in order to submit access requests (e.g., to get, insert, delete, or scan data).

In one embodiment, electronic device(s) 104 may encompass any type of client configurable to submit network-based requests to provider network 100 via network 106, including requests for time series database service 102 (e.g., to access item(s) in a series in time series database service 102 or to store data values in a time series database, such as measures, metrics, or other information collected by different devices implemented as part of an Internet of Things (IOT) architecture). In one embodiment a given client, such as electronic device 104, may include a suitable version of a web browser or may include a plug-in module or other type of code module that executes as an extension to or within an execution environment provided by a web browser. Alternatively, in a different embodiment, an electronic device 104 may encompass an application such as a database client/application (or user interface thereof), a media application, an office application or any other application that may make use of a time series in time series database service 102 to store and/or access the data to implement various applications. In one embodiment, such an application may include sufficient protocol support (e.g., for a suitable version of Hypertext Transfer Protocol (HTTP)) for generating and processing network-based services requests without necessarily implementing full browser support for all types of network-based data. That is, electronic device 104 may be an application that interacts directly with provider network 100, in one embodiment. In one embodiment, electronic device 104 may generate network-based services requests according to a Representational State Transfer (REST)-style network-based services architecture, a document- or message-based network-based services architecture, or another suitable network-based services architecture.

In some embodiments, clients of time series database service 102 may be implemented on resources within provider network 100 (not illustrated). For example, a client application may be hosted on a virtual machine or other computing resources implemented as part of another provider network service that may send access requests to time series database service 102 via an internal network (not illustrated) similar to the requests and interactions discussed with regard to electronic device(s) 104.

In one embodiment, an electronic device 104 may provide access to provider network 100 to other applications in a manner that is transparent to those applications. For example, client 290 may integrate with a database on time series database service 102. In such an embodiment, applications may not need to be modified to make use of a service model that utilizes time series database service 102. Instead, the details of interfacing to the time series database service 102 may be coordinated by client 290.

Electronic device(s) 104 may convey network-based services requests to and receive responses from provider network 100 via network 106, in one embodiment. In one embodiment, network 106 may encompass any suitable combination of networking hardware and protocols necessary to establish network-based-based communications between electronic devices 104 and provider network 100. For example, network 106 may encompass the various telecommunications networks and service providers that collectively implement the Internet. In one embodiment, network 106 may also include private networks such as local area networks (LANs) or wide area networks (WANs) as well as public or private wireless networks. For example, both a given electronic device 104 and provider network 100 may be respectively provisioned within enterprises having their own internal networks. In such an embodiment, network 106 may include the hardware (e.g., modems, routers, switches, load balancers, proxy servers, etc.) and software (e.g., protocol stacks, accounting software, firewall/security software, etc.) necessary to establish a networking link between given electronic device(s) 104 and the Internet as well as between the Internet and provider network 100. It is noted that in one embodiment, electronic device(s) 104 may communicate with provider network 100 using a private network rather than the public Internet.

Time series database service 102 may implement ingestion routing nodes 106, in some embodiments. Ingestion routing nodes 106 may perform requests to store items in a time series of a time series database hosted in time series database service 102. For example, an electronic device 104 may send a request to store an item in a time series to a network address or other endpoint which may be received at a load balancer which may implement one or more load balancing schemes to direct the request to one of ingestion routing nodes 106, in some embodiments. For example, ingestion nodes may apply various kinds of hash or other distribution schemes to identify which partition an item belongs to. Because ingestion routing nodes 106 may not be limited or assigned to particular time series databases, in some embodiments, ingestion routing nodes 106 may maintain partition schemes for storing items according to a partitioning scheme for the time series to which the item is to be added for any time series at any of the one or multiple time series databases that may be hosted by time series database service 102.

In some embodiments, time series database service 102 may also implement a data stream store, such as may be implemented by data stream storage nodes 108, each of which may manage one or more partitions 606 of a time series of a time series database on behalf of clients/users or on behalf of time series database service 102 which may be stored in storage (on storage devices attached to storage nodes 108 or in network storage accessible to storage nodes 108). Data stream storage nodes 108 may be implemented as part of a data stream service of provider network 100 (not illustrated) and utilized as the underlying storage for time series database service 102, in some embodiments. For example, each partition of a time series database may be a separate data stream that is hosted in the separate database service.

In some embodiments, time series database service 102 may implement stream processing nodes 110 to retrieve data from time series partitions, and send it to different storage tier nodes, such as storage tier nodes 608A to 608B. In this way, the different storage tier nodes 608 can ingest the time series data of a partition received from stream processing nodes 110. Control plane 124 may provide stream processing nodes with a mapping of partitions to storage nodes 608 (e.g., 2 copies of a partition in a first storage tier at two different nodes in storage tier nodes 608A and 4 copies of the partition in a second storage tier at four different nodes in storage tier nodes 608B).

In some embodiments, partition placement 126 is responsible for placing partitions on the storage tier nodes 608. For example, a plurality of hot tier storage nodes 608A may be provisioned to provide sufficient hot tier storage for the time period covered by the hot tier. Based on the storage space of each hot tier storage node, and the size of time series data elements being stored, the storage node(s) currently receiving time series data can be approximately identified. For example, 16 storage nodes may be provisioned to store the hot tier of 8 hours of time series data, with each storage node storing approximately 30 minutes of time series data. Because the time series data has affinity for the time it was collected, one or more storage nodes will generally be receiving time series data at a given system time, while the other provisioned storage nodes will generally be cold (e.g., not currently receiving time series data). Partition placement 124 can map partitions 606 to a plurality of hot tier storage nodes 608A, such that multiple hot partitions (e.g., partitions corresponding to the same period of time) are not mapped to the same storage tier node. As discussed above, this provides fault isolation between hot partitions, such that failure of a single host does not cause the loss of data from multiple partitions.

Different storage tiers may offer different types of query processing (or other analysis request) performance, in some embodiments. For example, a hot storage tier may ingest time series data into an in-memory data structure for providing fast query responses. Another storage tier, such as a cold storage tier, may ingest time series data into persistent storage as files or data objects (e.g., instead of individual records as may be implemented in the hot storage tier), which may offer a richer set of query or other analysis request features than hot tier storage and larger period of time in which the time series database data is available (e.g., older data is available than would be accessible in hot tier storage) but may incur higher processing cost and time to respond to queries and other analysis requests). Similarly, a warm tier may ingest time series data into persistent storage, such as an SSD, that may provide the richer query/analysis support of the cold tier, but with improved processing cost and latency as compared to the cold tier. The warm tier may include data from a larger period of time than the hot tier, but a smaller period of time than the cold tier.

In some embodiments, time series database service 102 may implement query routing nodes 610 to parse and dispatch queries to one or multiple time series in a time series database to the appropriate storage tier nodes 608 in different storage tiers, such as hot tier storage nodes, warm tier storage nodes, or cold tier storage nodes, as discussed below with regard to FIG. 7.

In one embodiment, time series database service 102 may implement control plane 124 to implement one or more administrative components. In various embodiments, control plane 124 may direct the performance of different types of control plane operations among the nodes, systems, or devices implementing time series database service 102, in one embodiment. Control plane 124 may provide visibility and control to system administrators via administrator console 604, in some embodiments. Admin console 604 may allow system administrators to interact directly with time series database service 102 (and/or the underlying system). In one embodiment, the admin console 604 may be the primary point of visibility and control for time series database service 102 (e.g., for configuration or reconfiguration by system administrators). For example, the admin console may be implemented as a relatively thin client that provides display and control functionally to system administrators and/or other privileged users, and through which system status indicators, metadata, and/or operating parameters may be observed and/or updated. Control plane 124 may provide an interface or access to information stored about one or more detected control plane events, such as data backup or other management operations for a time series, at time series database service 102, in one embodiment.

Node management 602 may provide resource allocation, in one embodiment, for storing additional data in time series submitted to database time series service 102. For instance, node management 602 may communicate with storage nodes 608 to initiate the performance of various control plane operations (such as requests to update create time series, configure time series, etc.). In one embodiment, node management 602 may include a node recovery feature or component that handles failure events for ingestion nodes 106, data stream storage nodes 108, storage tier nodes 110, and/or query routing nodes 610 (e.g., adding new nodes, removing failing or underperforming nodes, deactivating or decommissioning underutilized nodes, etc.).

Various durability, resiliency, control, or other operations may be directed by control plane 124. For example, partition management 600 may detect split, copy, or move events for time series partitions at storage nodes 608 in order to ensure that the storage nodes 608 satisfy a minimum performance level for performing access requests. For instance, in various embodiments, there may be situations in which a partition (or a replica thereof) may need to be copied, e.g., from one storage node to another. For example, if there are three replicas of a particular partition, each hosted on a different physical or logical machine, and one of the machines fails, the replica hosted on that machine may need to be replaced by a new copy of the partition on another machine. Node management 602 may then direct performance of the creation of the new copy. In another example, if a particular machine (e.g., host or node) that hosts multiple partitions of one or more tables experiences heavy traffic, one of the heavily accessed partitions may be moved (using a copy operation) to a machine that is experiencing less traffic in an attempt to more evenly distribute the system workload and improve performance.

In some embodiments, the partition moving process described above may be employed in partition splitting operations by partition management 600 in response to the detection of a partition split event. For example, a partition may be split because it is large, e.g., when it becomes too big to fit on one machine or storage device and/or in order to keep the partition size small enough to quickly rebuild the partitions hosted on a single machine (using a large number of parallel processes) in the event of a machine failure. A partition may also be split when it becomes too "hot" (i.e. when it experiences a much greater than average amount of traffic as compared to other partitions). For example, if the workload changes suddenly and/or dramatically for a given partition, the system may be configured to react quickly to the change. In some embodiments, the partition splitting process described herein may be transparent to applications and clients/users, which may allow the data storage service to be scaled automatically (i.e. without requiring client/user intervention or initiation). In some embodiments, a client application could request a partition operation (e.g., a split, move, merge, etc.) via control plane 124.

In some embodiments, each time series partition 606 may be identified by a partition ID, which may be a unique number (e.g., a GUID) assigned at the time the partition is created. When a partition is split, two new partitions may be created, each of which may have a respective new partition ID, and the original partition ID may no longer be used, in some embodiments. In some embodiments, a partition may be split by the system using a split tool or process in response to changing conditions.

Split or move events may be detected by partition management 600, in various ways. For example, partition size and heat, where heat may be tracked by internally measured metrics (such as IOPS), externally measured metrics (such as latency), and/or other factors may be evaluated with respect to various performance thresholds, in some embodiments. System anomalies may also trigger split or move events (e.g., network partitions that disrupt communications between replicas of a partition in a replica group, in some embodiments. Partition management 600 (or node management 602) may detect storage node failures, or provide other anomaly control, in some embodiments.

Time series database service 102 may provide an application programming interface (API) for requesting various operations targeting tables, indexes, items, and/or attributes maintained on behalf of storage service clients. In some embodiments, the service (and/or the underlying system) may provide both control plane APIs and data plane APIs. The control plane APIs provided by time series database service 102 (and/or the underlying system) may be used to manipulate series-level entities, such as time series and indexes and/or to re-configure various time series. These APIs may be called relatively infrequently (when compared to data plane APIs). In some embodiments, the control plane APIs provided by the service may be used to create time series or at separate storage nodes, import time series, export time series, delete time series, perform various trend analysis or other time series evaluations, modify time series configurations or operating parameter for time series, and/or describe time series. The data plane APIs provided by time series database service 102 (and/or the underlying system) may be used to perform item-level operations, such as requests for individual items or for multiple items in one or more time series, such as queries, batch operations, and/or scans.

The APIs provided by the service described herein may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

Figure 7:
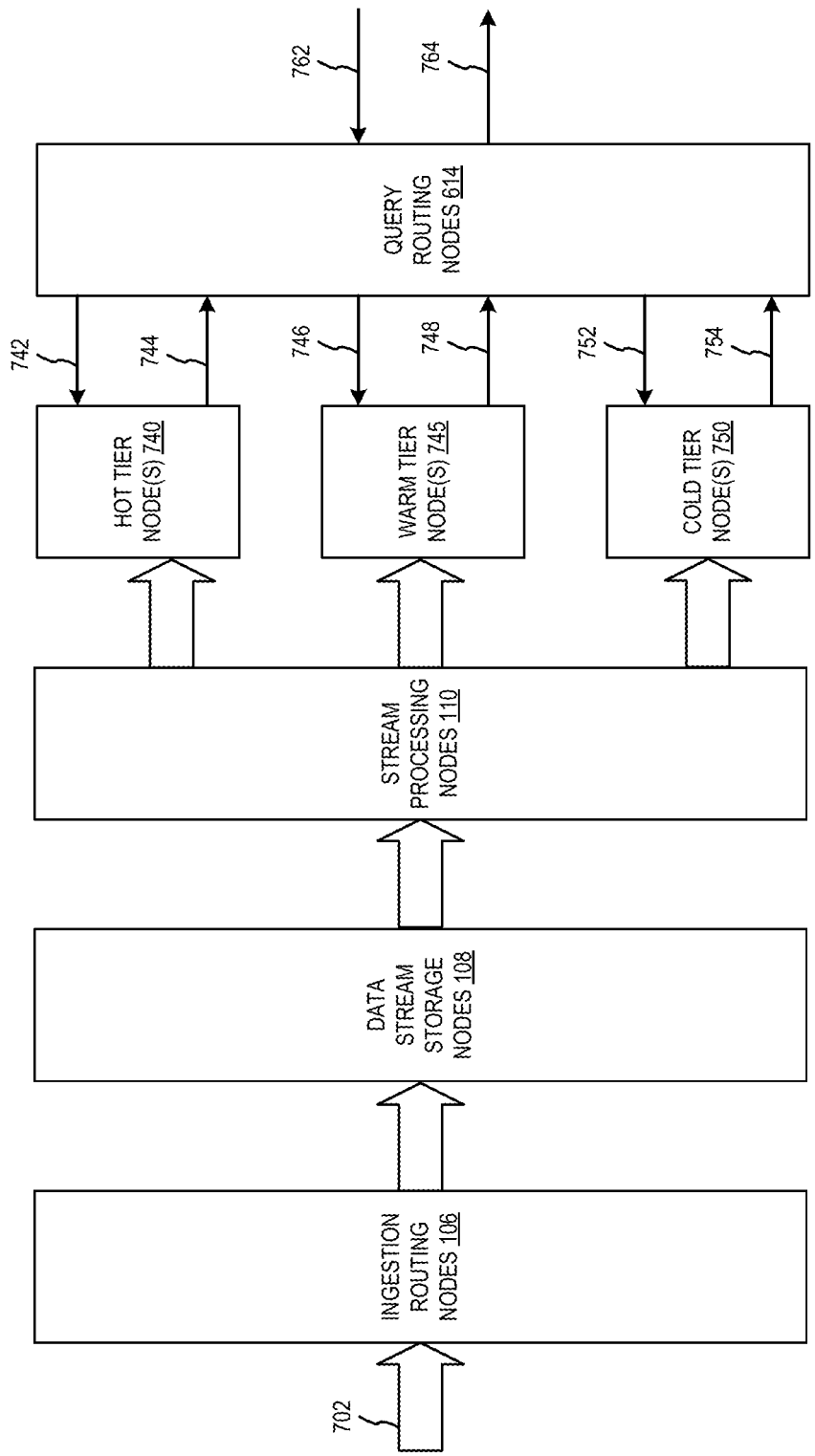
FIG. 7 is a diagram illustrating interactions to access a time series database, according to some embodiments.

FIG. 7 is a diagram illustrating interactions to access a time series database, according to some embodiments. An ingestion pipeline, technique or process may include receiving time series data 702 from a client of time series database service 102. For example, a submission API, or other request may accept time series data destined for an identified time series database, which ingestion routing node(s) 106 can then identify the appropriate data stream and data stream storage node(s) 108 that store the time series database identified for time series data 702. Stream processing node(s) 110 may then obtain time series data from data stream storage nodes 108 for ingestion into one or more storage tiers. For example, stream processing nodes may send the time series data to both hot tier node(s) 740, warm tier node(s) 745, and cold tier nodes 750, in some embodiments, in order to make the time series data available for performing different queries 762.

As illustrated in FIG. 7, clients of time series database service (which may be different than the source of time series data 702 in some scenarios), may submit queries 762 via an interface to time series database service 102 (e.g., an API, an established connection, protocol, and/or query language, etc.). As noted above, query routing node(s) 614 can identify based on the type of query (and/or the workload of the underlying storage tier nodes) which storage tier nodes should perform the query. For instance, query routing nodes 614 may recognize queries to recent data (e.g., less than a time value threshold) and forward the request to hot tier storage nodes 740, which may maintain recent data in-memory in order to quickly perform queries, in some embodiments. Thus query routing nodes 614 may forward queries 742 to hot tier node(s) 740, which may provide query results 744 to query routing node(s) 614 which may then provide the results 764 to a requesting client. For queries to older data (or more complex operations, such as cross time series joins, time series analysis operations, etc.), query routing nodes 760 may forward the queries 752 on to cold tier storage nodes 750, which may be utilized to access time series data in slower storage (e.g., either from local storage or in a backup or archive store (not illustrated)). Cold tier node(s) 750 may perform the quer(ies) 752 and return results 754 to query routing node(s) 760, which may provide the query results 764 to a requesting client. In some embodiments, a warm tier may also be implemented, using warm tier node(s) 745 for data that is older than that maintained in the hot tier and younger than that maintained in the cold tier. The warm tier may provide improved performance of query and/or more complex operation processing as compared to the cold tier. For such queries (or more complex operations), query routing nodes 614 may forward the queries 746 on to warm tier storage nodes 745, which may be utilized to access time series data in local durable storage, such as solid state drives. Warm tier node(s) 745 may perform the quer(ies) 746 and return results 748 to query routing node(s) 614, which may provide the query results 764 to a requesting client.

Figure 8:
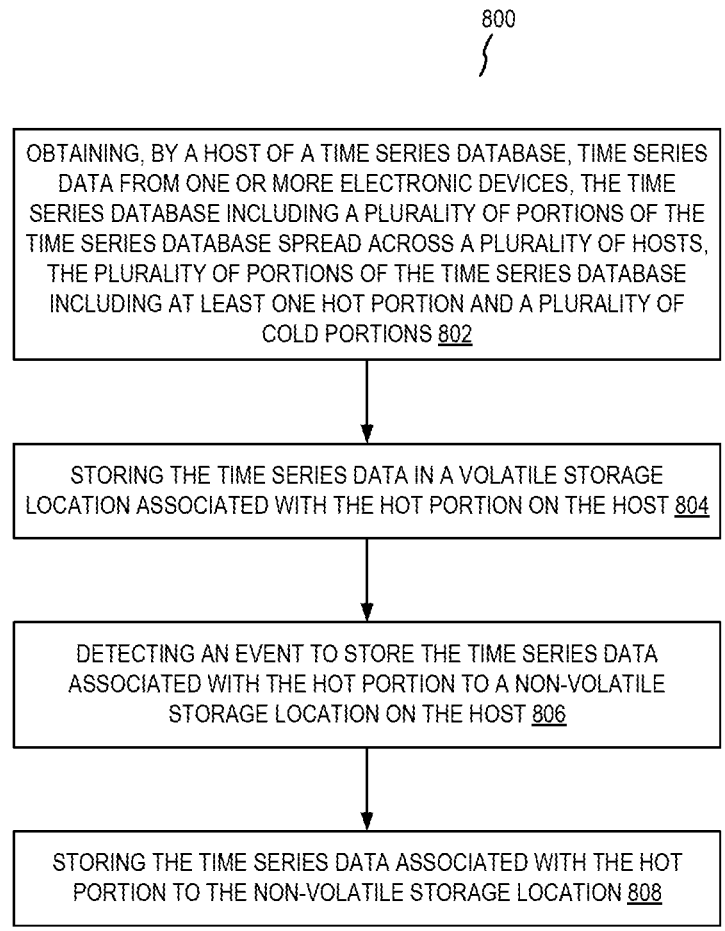
FIG. 8 is a flow diagram illustrating operations of a method for in-memory ingestion for highly available distributed time-series databases according to some embodiments.

FIG. 8 is a flow diagram illustrating operations of a method for in-memory ingestion for highly available distributed time-series databases according to some embodiments. Some or all of the operations 800 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 800 are performed by backup manager 120, control plane 124, etc. of the other figures.

The operations 800 include, at block 802, obtaining, by a host of a time series database, time series data from one or more electronic devices, the time series database including a plurality of portions of the time series database spread across a plurality of hosts, the plurality of portions of the time series database including at least one hot portion and a plurality of cold portions. In some embodiments, each portion of the time series database including the time series data corresponding to at least one series from at least one period of time.

The operations 800 further include, at block 804, storing the time series data in a volatile storage location associated with the hot portion on the host. In some embodiments, the plurality of portions of the time series database are spread across the plurality of hosts such that a particular host from the plurality of hosts includes a minimum number of hot portions of the time series database that are receiving the time series data at a particular time and one or more cold portions of the time series database that are not receiving the time series data.

The operations 800 further include, at block 806, detecting an event to store the time series data associated with the hot portion to a non-volatile storage location on the host. In some embodiments, detecting an event to store the time series data associated with the hot portion to a non-volatile storage location on the host, may further include obtaining a current system time on the host, and determining the current system time is outside an active time parameter associated with the at least one hot portion of the time series database on the host. In some embodiments, in response to detecting an event to store at least a portion of the time series data to a non-volatile storage location on the host, the operations may further include reducing a number of replicas associated with the hot portion.

In some embodiments, the host includes an activity monitor that detects when the host obtains the time series data. In some embodiments, detecting an event to store at least a portion of the time series data to a non-volatile storage location on the host, may further include determining, by the activity monitor, that a time period has elapsed since the time series data was obtained by the host, the time period greater than an active threshold. In some embodiments, a hot portion of the time series database is replicated to a first number of hosts and a cold portion of the time series database is replicated to a second number of hosts, wherein the first number of hosts is greater than the second number of hosts. In some embodiments, the operations may further include determining, by the activity monitor on the host or a second activity monitor on a control plane associated with the host, that the hot portion of the time series database has become inactive, and reducing a number of replicas associated with the hot portion of the time series database from the first number of hosts to the second number of hosts.

The operations 800 further include, at block 808, storing the time series data associated with the hot portion to the non-volatile storage location. In some embodiments, storing the time series data associated with the hot portion to the non-volatile storage location, may further include storing a marker file to the non-volatile storage location, the marker file including a backup of at least the portion of the time series data. In some embodiments, the operations may further include restarting the time series database on the host, detecting the marker file in the non-volatile storage location, determining a sentinel port is accessible, and recovering at least the portion of the time series data from the marker file. In some embodiments, the operations may further include restarting the time series database on the host, detecting the marker file in the non-volatile storage location, determining a sentinel port is accessible, and deleting the marker file.

In some embodiments, the operations may include provisioning a plurality of hosts of a time series database to include a plurality of partitions of the time series database, each partition of the time series database including time series data corresponding to at least one series from at least one period of time, receiving, by a host of a time series database, time series data from one or more electronic devices, the host including at least one hot partition and a plurality of cold partitions, wherein the hot partition includes a backup manager that detects backup events and an activity monitor that detects when the hot partition received time series data, storing the time series data in memory on the host associated with the hot partition, detecting, by the backup manager, a backup event generated by the activity monitor, the backup event indicating that the hot partition has not received data for a threshold amount of time, and storing the time series data associated with the hot partition to a solid state drive coupled to the host.

In some embodiments, the time series data includes a first series emitted by a first electronic device, the first series including a plurality of key value pairs, wherein each key is a timestamp and each value is a measurement value. In some embodiments, the first series includes a plurality of dimensions, each dimension identifying a different metric in the first series.

Figure 9:
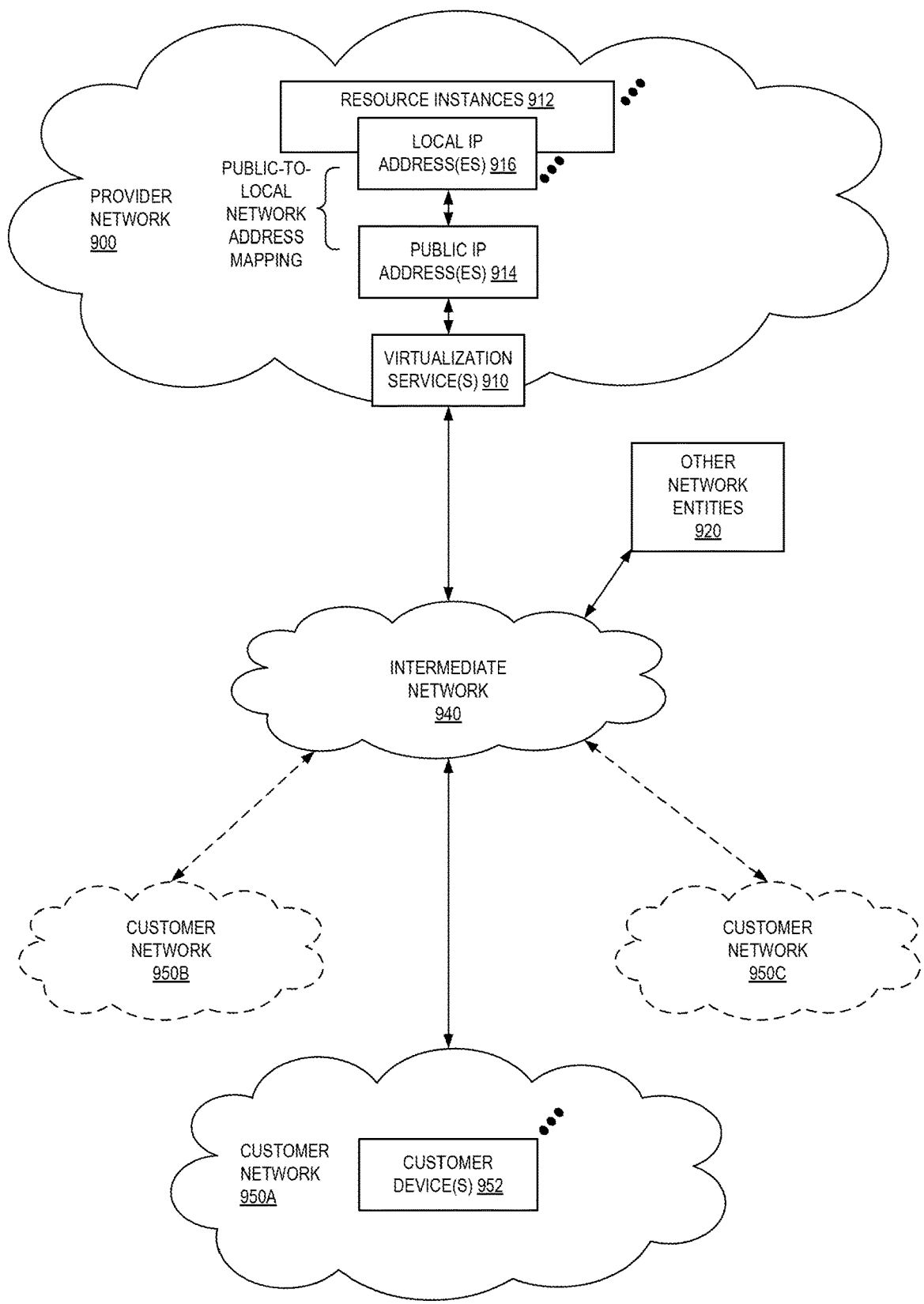
FIG. 9 illustrates an example provider network environment according to some embodiments.

FIG. 9 illustrates an example provider network (or "service provider system") environment according to some embodiments. A provider network 900 may provide resource virtualization to customers via one or more virtualization services 910 that allow customers to purchase, rent, or otherwise obtain instances 912 of virtualized resources, including but not limited to computation and storage resources, implemented on devices within the provider network or networks in one or more data centers. Local Internet Protocol (IP) addresses 916 may be associated with the resource instances 912; the local IP addresses are the internal network addresses of the resource instances 912 on the provider network 900. In some embodiments, the provider network 900 may also provide public IP addresses 914 and/or public IP address ranges (e.g., Internet Protocol version 4 (IPv4) or Internet Protocol version 6 (IPv6) addresses) that customers may obtain from the provider 900.

Conventionally, the provider network 900, via the virtualization services 910, may allow a customer of the service provider (e.g., a customer that operates one or more client networks 950A-950C including one or more customer device(s) 952) to dynamically associate at least some public IP addresses 914 assigned or allocated to the customer with particular resource instances 912 assigned to the customer. The provider network 900 may also allow the customer to remap a public IP address 914, previously mapped to one virtualized computing resource instance 912 allocated to the customer, to another virtualized computing resource instance 912 that is also allocated to the customer. Using the virtualized computing resource instances 912 and public IP addresses 914 provided by the service provider, a customer of the service provider such as the operator of customer network(s) 950A-950C may, for example, implement customer-specific applications and present the customer's applications on an intermediate network 940, such as the Internet. Other network entities 920 on the intermediate network 940 may then generate traffic to a destination public IP address 914 published by the customer network(s) 950A-950C; the traffic is routed to the service provider data center, and at the data center is routed, via a network substrate, to the local IP address 916 of the virtualized computing resource instance 912 currently mapped to the destination public IP address 914. Similarly, response traffic from the virtualized computing resource instance 912 may be routed via the network substrate back onto the intermediate network 940 to the source entity 920.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 900; a customer may then assign their allocated public IP addresses to particular resource instances allocated to the customer. These public IP addresses may be referred to as customer public IP addresses, or simply customer IP addresses. Instead of being assigned by the provider network 900 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 10:
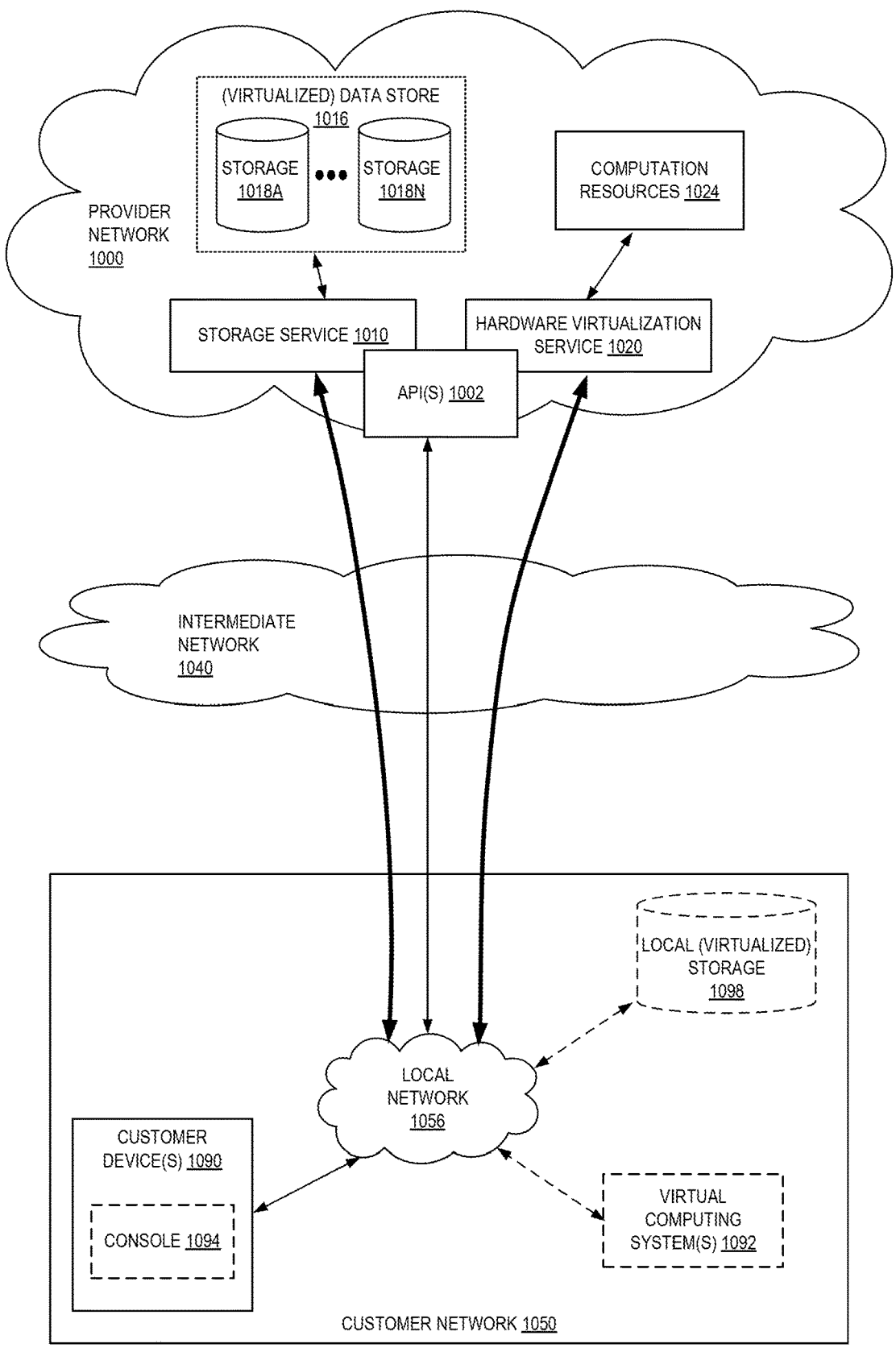
FIG. 10 is a block diagram of an example provider network that provides a storage service and a hardware virtualization service to customers according to some embodiments.

FIG. 10 is a block diagram of an example provider network that provides a storage service and a hardware virtualization service to customers, according to some embodiments. Hardware virtualization service 1020 provides multiple computation resources 1024 (e.g., VMs) to customers. The computation resources 1024 may, for example, be rented or leased to customers of the provider network 1000 (e.g., to a customer that implements customer network 1050). Each computation resource 1024 may be provided with one or more local IP addresses. Provider network 1000 may be configured to route packets from the local IP addresses of the computation resources 1024 to public Internet destinations, and from public Internet sources to the local IP addresses of computation resources 1024.

Provider network 1000 may provide a customer network 1050, for example coupled to intermediate network 1040 via local network 1056, the ability to implement virtual computing systems 1092 via hardware virtualization service 1020 coupled to intermediate network 1040 and to provider network 1000. In some embodiments, hardware virtualization service 1020 may provide one or more APIs 1002, for example a web services interface, via which a customer network 1050 may access functionality provided by the hardware virtualization service 1020, for example via a console 1094 (e.g., a web-based application, standalone application, mobile application, etc.). In some embodiments, at the provider network 1000, each virtual computing system 1092 at customer network 1050 may correspond to a computation resource 1024 that is leased, rented, or otherwise provided to customer network 1050.

From an instance of a virtual computing system 1092 and/or another customer device 1090 (e.g., via console 1094), the customer may access the functionality of storage service 1010, for example via one or more APIs 1002, to access data from and store data to storage resources 1018A-1018N of a virtual data store 1016 (e.g., a folder or "bucket", a virtualized volume, a database, etc.) provided by the provider network 1000. In some embodiments, a virtualized data store gateway (not shown) may be provided at the customer network 1050 that may locally cache at least some data, for example frequently-accessed or critical data, and that may communicate with storage service 1010 via one or more communications channels to upload new or modified data from a local cache so that the primary store of data (virtualized data store 1016) is maintained. In some embodiments, a user, via a virtual computing system 1092 and/or on another customer device 1090, may mount and access virtual data store 1016 volumes via storage service 1010 acting as a storage virtualization service, and these volumes may appear to the user as local (virtualized) storage 1098.

While not shown in FIG. 10, the virtualization service(s) may also be accessed from resource instances within the provider network 1000 via API(s) 1002. For example, a customer, appliance service provider, or other entity may access a virtualization service from within a respective virtual network on the provider network 1000 via an API 1002 to request allocation of one or more resource instances within the virtual network or within another virtual network.

Illustrative System

Figure 11:
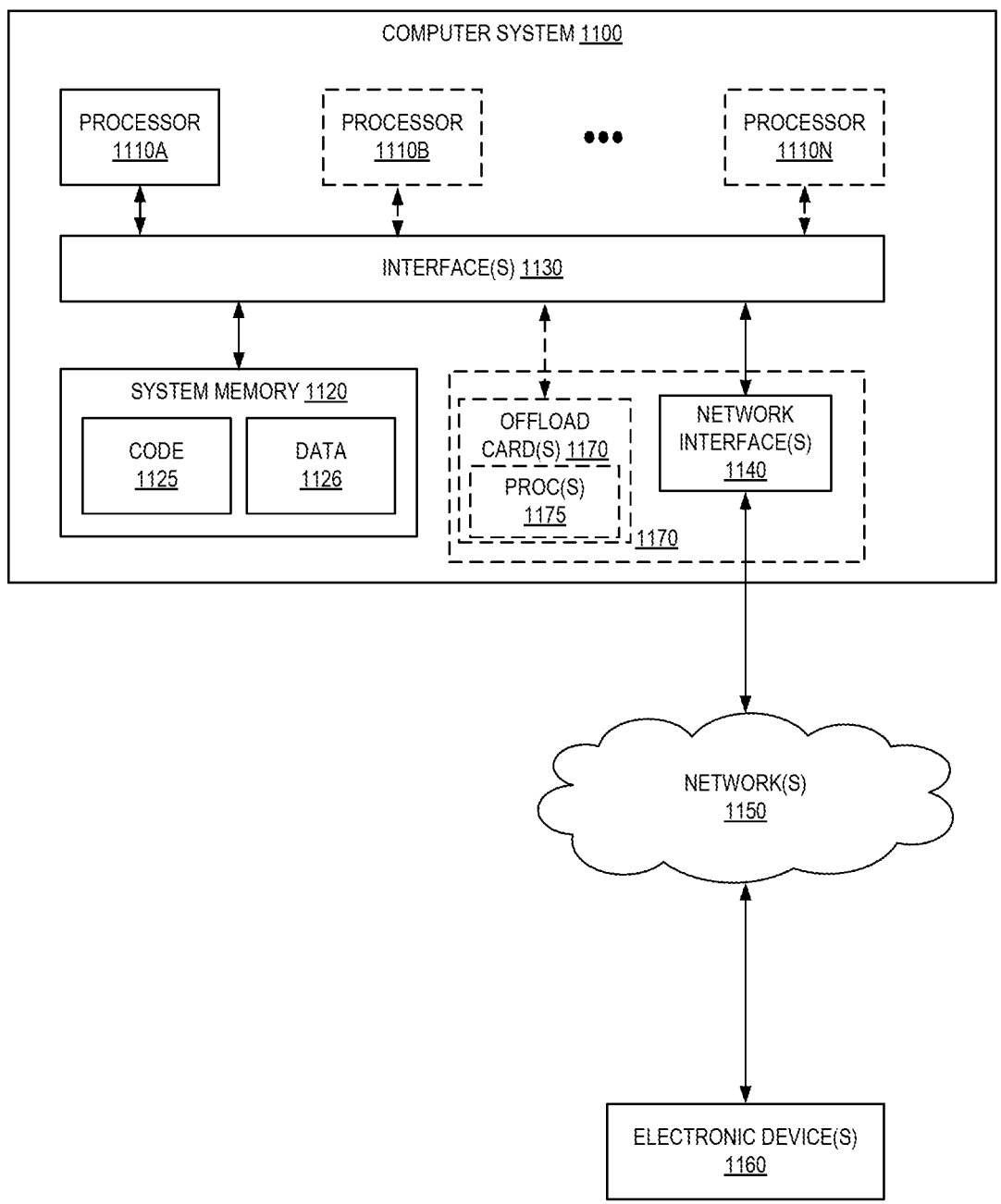
FIG. 11 is a block diagram illustrating an example computer system that may be used in some embodiments.

In some embodiments, a system that implements a portion or all of the techniques for in-memory ingestion for highly available distributed time-series databases as described herein may include a general-purpose computer system that includes or is configured to access one or more computer-accessible media, such as computer system 1100 illustrated in FIG. 11. In the illustrated embodiment, computer system 1100 includes one or more processors 1110 coupled to a system memory 1120 via an input/output (I/O) interface 1130. Computer system 1100 further includes a network interface 1140 coupled to I/O interface 1130. While FIG. 11 shows computer system 1100 as a single computing device, in various embodiments a computer system 1100 may include one computing device or any number of computing devices configured to work together as a single computer system 1100.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1110 may commonly, but not necessarily, implement the same ISA.

System memory 1120 may store instructions and data accessible by processor(s) 1110. In various embodiments, system memory 1120 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1120 as code 1125 and data 1126.

In one embodiment, I/O interface 1130 may be configured to coordinate I/O traffic between processor 1110, system memory 1120, and any peripheral devices in the device, including network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices 1160 attached to a network or networks 1150, such as other computer systems or devices as illustrated in FIG. 1, for example. In various embodiments, network interface 1140 may support communication via any suitable wired or wireless general data networks, such as types of Ethernet network, for example. Additionally, network interface 1140 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1100 includes one or more offload cards 1170 (including one or more processors 1175, and possibly including the one or more network interfaces 1140) that are connected using an I/O interface 1130 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1100 may act as a host electronic device (e.g., operating as part of a hardware virtualization service) that hosts compute instances, and the one or more offload cards 1170 execute a virtualization manager that can manage compute instances that execute on the host electronic device. As an example, in some embodiments the offload card(s) 1170 can perform compute instance management operations such as pausing and/or un-pausing compute instances, launching and/or terminating compute instances, performing memory transfer/copying operations, etc. These management operations may, in some embodiments, be performed by the offload card(s) 1170 in coordination with a hypervisor (e.g., upon a request from a hypervisor) that is executed by the other processors 1110A-1110N of the computer system 1100. However, in some embodiments the virtualization manager implemented by the offload card(s) 1170 can accommodate requests from other entities (e.g., from compute instances themselves), and may not coordinate with (or service) any separate hypervisor.

In some embodiments, system memory 1120 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1100 via I/O interface 1130. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 112A, 112B, 114A, 114B1, 116A, 116B, 118A, 118B, 200A, 200B, 608A, 608B, and 1018A-1018N, etc.) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
provisioning a plurality of hosts of a time series database to include a plurality of partitions of the time series database, each partition of the time series database including time series data corresponding to at least one series from at least one period of time;

receiving, by a host of a time series database, time series data from one or more electronic devices, the host including at least one hot partition and a plurality of cold partitions, wherein the hot partition includes a backup manager that detects backup events and an activity monitor that detects when the hot partition received time series data;

storing the time series data in memory on the host associated with the hot partition;

detecting, by the backup manager, a backup event generated by the activity monitor, the backup event indicating that the hot partition has not received data for a threshold amount of time; and storing the time series data associated with the hot partition to a solid state drive coupled to the host.

2. The computer-implemented method of claim 1, wherein the time series data includes a first series emitted by a first electronic device, the first series including a plurality of key value pairs, wherein each key is a timestamp and each value is a measurement value.

3. The computer-implemented method of claim 2, wherein the first series includes a plurality of dimensions, each dimension identifying a different metric in the first series.

4. A computer-implemented method comprising:
obtaining, by a host of a time series database, time series data from one or more electronic devices, the time series database including a plurality of portions of the time series database spread across a plurality of hosts, the plurality of portions of the time series database including at least one hot portion and a plurality of cold portions;

storing the time series data in a volatile storage location associated with the hot portion on the host;

detecting an event to store the time series data associated with the hot portion to a non-volatile storage location on the host; and storing the time series data associated with the hot portion to the non-volatile storage location.

5. The computer-implemented method of claim 4, wherein each portion of the time series database includes the time series data corresponding to at least one series from at least one period of time.

6. The computer-implemented method of claim 5, wherein the plurality of portions of the time series database are spread across the plurality of hosts such that a particular host from the plurality of hosts includes a minimum number of hot portions of the time series database that are receiving the time series data at a particular time and one or more cold portions of the time series database that are not receiving the time series data at the particular time.

7. The computer-implemented method of claim 4, wherein detecting an event to store the time series data associated with the hot portion to a non-volatile storage location on the host, further comprises:
obtaining a current system time on the host; and
determining the current system time is outside an active time parameter associated with the at least one hot portion of the time series database on the host.

8. The computer-implemented method of claim 4, wherein the host includes an activity monitor that detects when the host obtains the time series data.

9. The computer-implemented method of claim 8, wherein detecting an event to store the time series data associated with the hot portion to a non-volatile storage location on the host, further comprises:
determining, by the activity monitor, that a time period has elapsed since the time series data was obtained by the host, the time period greater than an active threshold.

10. The computer-implemented method of claim 4, wherein storing the time series data associated with the hot portion to the non-volatile storage location, further comprises:
storing a marker file to the non-volatile storage location, the marker file including a backup of at least the portion of the time series data.

11. The computer-implemented method of claim 10, wherein a hot portion of the time series database is replicated to a first number of hosts and a cold portion of the time series database is replicated to a second number of hosts, wherein the first number of hosts is greater than the second number of hosts.

12. The computer-implemented method of claim 11, further comprising:
determining, by the activity monitor on the host or a second activity monitor on a control plane associated with the host, that the hot portion of the time series database has become inactive; and
reducing a number of replicas associated with the hot portion of the time series database from the first number of hosts to the second number of hosts.

13. The computer-implemented method of claim 12, further comprising:
restarting the time series database on the host;
detecting the marker file in the non-volatile storage location;
determining a sentinel port is accessible; and
recovering at least the portion of the time series data from the marker file.

14. The computer-implemented method of claim 12, further comprising:
restarting the time series database on the host;
detecting the marker file in the non-volatile storage location;
determining a sentinel port is accessible; and
deleting the marker file.

15. A system comprising:
a first one or more electronic devices implementing an ingestion pipeline of a time series database; and
a second one or more electronic device, including at least one processor, implementing a host of the time series database, the host including instructions that upon execution by the at least one processor, cause the host to:
obtain, from the ingestion pipeline, time series data from one or more electronic devices, the time series database including a plurality of portions of the time series database spread across a plurality of hosts, the plurality of portions of the time series database including at least one hot portion and a plurality of cold portions;
store the time series data in a volatile storage location associated with the hot portion on the host;
detect an event to store the time series data associated with the hot portion to a non-volatile storage location on the host; and
store the time series data associated with the hot portion to the non-volatile storage location.

16. The system of claim 15, wherein the instructions, when executed, further cause the host to:

provision a plurality of hosts of the time series database to include a plurality of portions of the time series database, each portion of the time series database including the time series data corresponding to at least one series from at least one period of time.

17. The system of claim 16, wherein the plurality of portions of the time series database are spread across the plurality of hosts such that a particular host from the plurality of hosts includes a minimum number of hot portions of the time series database that are receiving the time series data at a particular time and one or more cold portions of the time series database that are not receiving the time series data.

18. The system of claim 15, wherein the instructions to detect an event to store the time series data associated with the hot portion to the non-volatile storage location, when executed, further cause the host to:
   obtain a current system time on the host; and
   determine the current system time is outside an active time parameter associated with the at least one hot portion of the time series database on the host.

19. The system of claim 15, wherein the host includes an activity monitor that detects when the host obtains the time series data.

20. The system of claim 19, wherein the instructions to detect an event to store the time series data associated with the hot portion to a non-volatile storage location on the host, further cause the host to:
   determine, by the activity monitor, that a time period has elapsed since the time series data was obtained by the host, the time period greater than an active threshold.

* * * * *